United States Patent
Prissok et al.

(10) Patent No.: US 10,941,263 B2
(45) Date of Patent: Mar. 9, 2021

(54) POLYURETHANE PARTICLE FOAM WITH POLYURETHANE COATING

(71) Applicant: BASF SE, Ludwigshafen (DE)

(72) Inventors: Frank Prissok, Lemförde (DE);
Michael Harms, Diepholz (DE);
Martin Vallo, Bramsche (DE)

(73) Assignee: BASF SE, Ludwigshafen (DE)

( * ) Notice: Subject to any disclaimer, the term of this patent is extended or adjusted under 35 U.S.C. 154(b) by 41 days.

(21) Appl. No.: 15/307,134

(22) PCT Filed: Apr. 14, 2015

(86) PCT No.: PCT/EP2015/058013
§ 371 (c)(1),
(2) Date: Oct. 27, 2016

(87) PCT Pub. No.: WO2015/165724
PCT Pub. Date: Nov. 5, 2015

(65) Prior Publication Data
US 2017/0051121 A1 Feb. 23, 2017

(30) Foreign Application Priority Data

Apr. 30, 2014 (EP) ..................................... 14166522

(51) Int. Cl.
| | |
|---|---|
| *C08J 7/04* | (2020.01) |
| *C08J 9/36* | (2006.01) |
| *C08G 18/48* | (2006.01) |
| *C08G 18/32* | (2006.01) |
| *C08J 9/228* | (2006.01) |
| *C08G 18/66* | (2006.01) |
| *B05D 1/02* | (2006.01) |
| *B05D 1/18* | (2006.01) |
| *B05D 1/28* | (2006.01) |
| *C08G 18/76* | (2006.01) |
| *C09D 175/04* | (2006.01) |

(52) U.S. Cl.
CPC .............. *C08J 7/0427* (2020.01); *B05D 1/02* (2013.01); *B05D 1/18* (2013.01); *B05D 1/28* (2013.01); *C08G 18/3206* (2013.01); *C08G 18/4854* (2013.01); *C08G 18/6674* (2013.01); *C08G 18/6681* (2013.01); *C08G 18/7671* (2013.01); *C08J 9/228* (2013.01); *C08J 9/365* (2013.01); *C09D 175/04* (2013.01); *C08J 2375/04* (2013.01); *C08J 2475/04* (2013.01)

(58) Field of Classification Search
CPC ....................................... C09J 7/22; C09J 7/38
See application file for complete search history.

(56) References Cited

U.S. PATENT DOCUMENTS

| | | | |
|---|---|---|---|
| 2,994,110 A | 8/1961 | Hardy | |
| 3,473,951 A | 10/1969 | De Rossi et al. | |
| 5,288,549 A | 2/1994 | Zeitler et al. | |
| 2012/0065285 A1 | 3/2012 | Braun et al. | |
| 2012/0329892 A1 | 12/2012 | Prissok et al. | |
| 2014/0017450 A1* | 1/2014 | Baghdadi ............ | B29C 44/3415 428/160 |
| 2015/0252163 A1 | 9/2015 | Prissok et al. | |

FOREIGN PATENT DOCUMENTS

| | | |
|---|---|---|
| DE | 41 07 454 A1 | 9/1992 |
| EP | 2 435 231 A1 | 4/2012 |
| EP | 2 435 231 B1 | 2/2014 |
| WO | WO-02/04208 A1 | 1/2002 |
| WO | WO-2007/082838 A1 | 7/2007 |
| WO | WO-2008/087078 A1 | 7/2008 |
| WO | WO-2010/136398 A1 | 12/2010 |

OTHER PUBLICATIONS

Dr. P. Gupta, et al., "Polyurethane" Kunststoff Handbuch, Carl Hanser Verlag, 3$^{rd}$ Edition, Edited by Günter Oertel, vol. 7, Chapter 3.1., 1993, pp. 57-75 (with Cover Page).
International Search Report for PCT/EP2015/058013 dated Nov. 5, 2015 with Written Opinion (in German) Attached.
International Preliminary Examination Report (in German) for PCT/EP2015/058013 dated Mar. 24, 2016.

* cited by examiner

*Primary Examiner* — Alicia Chevalier
*Assistant Examiner* — Victor S Chang
(74) *Attorney, Agent, or Firm* — Grüneberg and Myers PLLC

(57) ABSTRACT

The present invention relates to coated shaped articles comprising at least one shaped article comprising foamed beads comprising at least one polyurethane (A) and at least one coating comprising at least one polyurethane (B), wherein polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical. The present invention further relates to processes for producing the coated shaped articles of the present invention and also to the method of using the coated shaped articles of the present invention for various applications.

7 Claims, No Drawings

POLYURETHANE PARTICLE FOAM WITH POLYURETHANE COATING

RELATED APPLICATIONS

This application is a national stage application (under 35 U.S.C. § 371) of PCT/EP2015/058013, filed Apr. 14, 2015, which claims benefit of European Application No. 14166522.4, filed Apr. 30, 2014.

The present invention relates to coated shaped articles comprising at least one shaped article comprising foamed beads comprising at least one polyurethane (A) and at least one coating comprising at least one polyurethane (B), wherein polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical. The present invention further relates to processes for producing the coated shaped articles of the present invention and also to the method of using the coated shaped articles of the present invention for various applications.

Polyurethanes have a wide range of properties and so are currently used in a multiplicity of applications. Both compact and foamed polyurethanes can be used therein, making it possible to cover a very wide range of density extending from compact, at a density above 1.00 g/cm$^3$, to about 0.01 g/cm$^3$ for foamed articles. The polyurethanes involved may be, for example, in the form of thermosets, elastomers, thermoplastic elastomers (TPUs), microcellular elastomers, integral foams, flexible foams, rigid foams or semi-rigid foams. Polyurethanes may also be combined with other materials to produce composite materials to further extend the field of use for the engineering material "polyurethane". Thus, foamed beads can be incorporated in a matrix of polyurethane to obtain hybrid materials having reduced density and special properties, and/or to reduce material-related costs.

Correspondingly processing the formulations into low-density flexible moldings in the form of a system foam that is likewise closed-cell is impossible because of the shrinkage which occurs. A combination of a bead foam, which is closed-cell, with a nearly chemically identical component, which is processed as system foam and displays good adherence to the bead foam, is described in the WO 2008/087078 application. The product obtained is shrinkage-free even at low density and displays better mechanical properties than a purely system foam on the same basis. The good adherence of the open-cell phase to the closed-cell phase is due to the chemically identical construction.

High-resilience closed-cell foams, such as bead foams comprising thermoplastic polyurethane, are also disclosed in WO 2007/082838 for example. They display good mechanical properties and high levels of rebound resilience. They are simple and inexpensive to process into moldings, for the shoe industry for example, on automatic molding machines by superheated steam fusion. Owing to the requisite steam nozzles in the mold and the visibility of the interstitial seams after demolding, the surface formed tends to be rough and uneven and not very suitable for applications exposed to view. The roughness additionally causes light-colored surfaces to soil worse than smooth ones. A further problem with visible components formed from polyurethane bead foams is colorability. Owing to the low density of the foams and the fact that, in contradistinction to system foams, there is scarcely any molding skin, pastel coloration is possible, intensive hues by mass coloration are impossible because of the production process.

It is an object of the present invention to provide shaped articles having good mechanical properties, for example elasticity and tensile strength, coupled with smooth and robust surfaces.

It is a further object of the present invention to provide materials having good mechanical properties coupled with smooth and robust surfaces which are simple to color, and/or processes for production thereof.

We have found that this object is achieved according to the present invention by coated shaped articles comprising
 (a) at least one shaped article comprising foamed beads comprising at least one polyurethane (A) and
 (b) at least one coating comprising at least one polyurethane (B),
wherein polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical.

The weight fractions in question are determined as follows: All the polyol components of polyurethanes (A) and (B) are determined and listed by determining the wt % of the individual polyols based on the entirety of the polyols, which adds up to 100 wt %, of the particular polyurethane. Comparing, then, the individual polyols and their parts by weight, not less than 50 wt % of the polyols of polyurethane (A) must also be present in polyurethane (B), and vice versa.

Corresponding computations apply to the amounts of polyisocyanate component.

In effect, the numerical values in wt % indicate the degree of correspondence between the basic building blocks of the polyurethanes. This correspondence is particularly high in the present invention, so the shaped article comprising foamed beads and the coating correspondingly display good adherence to each other.

According to the present invention, the coated shaped article comprises at least one shaped article comprising foamed beads comprising at least one polyurethane (A) and at least one coating comprising at least one polyurethane (B).

According to the present invention, the shaped article may comprise further components. For example, the shaped article may comprise a further coating. And it is possible according to the present invention for the foamed bead or one of the coatings, in particular the coating comprising polyurethane (B), to comprise further auxiliary or added-substance materials, for example fillers, additives, pigments or dyes.

The shaped articles of the present invention differ from purely bead foams in having a surface which is more robust, smoother and colorable as desired, in particular multicolorable. Because not less than 50 wt % of the polyol component used for constructing polyurethane (A) and polyurethane (B) is identical and not less than 50 wt % of the at least one polyisocyanate component used for constructing polyurethane (A) and polyurethane (B) is identical, outstanding adherence results between the phases which contribute to a high level of mechanical strength on the part of the coating.

Surprisingly, combining the shaped article comprising a bead foam with a coating comprising a polyurethane which is chemically sufficiently similar to the bead foam and displays outstanding adherence thereto results in the product obtained meeting the above-described range of requirements, in particular by having good mechanical properties, and possessing an abrasion-resistant, glossy, multicolored and opaque coating.

In the context of the present invention, the thickness of the coating may vary within wide limits. The thickness of the coating is preferably chosen such that the bead structure of the shaped article is retained. Coating thickness according to the present invention is for example in the range from 50 to 1000 μm, preferably in the range from 100 to 800 μm and more preferably in the range from 250 to 750 μm.

Accordingly, the present invention in a further embodiment provides a shaped article as described above wherein the coating has a thickness in the range from 50 to 1000 μm.

Owing to the sufficient similarity of the present invention, i.e., the fact that polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical, the bond between the carrier foam and the coating is so good that separation after drying is no longer possible.

Since the solvent used in producing the shaped articles of the present invention dissolves, or incipiently dissolves, the coating and the foam to substantially the same extent, the production of the shaped articles according to the present invention results in optimum adherence and skinning on the foam surface.

According to the present invention, the coated shaped article comprises at least one shaped article comprising foamed beads comprising at least one polyurethane (A) and at least one coating comprising at least one polyurethane (B). In one preferred embodiment, the shaped article of the present invention includes no further components in addition to the shaped article comprising foamed beads comprising at least one polyurethane (A) and the coating comprising at least one polyurethane (B). Accordingly, the coated shaped article of the present invention consists of a shaped article comprising foamed beads comprising at least one polyurethane (A) and a coating comprising at least one polyurethane (B).

In fact, the shaped article consists of foamed beads comprising at least one polyurethane (A), preferably of foamed beads comprising exactly one polyurethane (A). The coating of the present invention is of at least one polyurethane (B), preferably of exactly one polyurethane (B).

Accordingly, the present invention in one preferred embodiment provides coated shaped articles consisting of
(a) a shaped article comprising foamed beads comprising polyurethane (A) and
(b) a coating comprising polyurethane (B),
wherein polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical.

According to the present invention, polyurethane (A) and polyurethane (B) are each constructed from at least one polyol and at least one polyisocyanate. Not less than 50 wt % of the polyol component used for constructing polyurethane (A) and polyurethane (B) is identical and not less than 50 wt % of the at least one polyisocyanate component used for constructing polyurethane (A) and polyurethane (B) is identical.

Preferably, according to the present invention, not less than 60 wt % of the polyol component used for constructing polyurethane (A) and polyurethane (B) is identical, in particular not less than 70 wt % and more preferably not less than 85 wt %.

It is further preferable according to the present invention for not less than 60 wt % of the at least one polyisocyanate component used for constructing polyurethane (A) and polyurethane (B) to be identical, in particular not less than 70 wt % and more preferably not less than 85 wt %.

In one embodiment, at least 15 wt % of the polyol component used for constructing polyurethane (A) and polyurethane (B) is not identical and/or at least 15 wt % of the at least one polyisocyanate component used for constructing polyurethane (A) and polyurethane (B) is not identical.

And it is possible in the context of the present invention for the degree of similarity between the polyol components used to differ from the degree of similarity between the isocyanate components used in that, for example, not less than 60 wt % of the polyol component used for constructing polyurethane (A) and polyurethane (B) is identical and not less than 70 wt % of the at least one polyisocyanate component used for constructing polyurethane (A) and polyurethane (B) is identical.

However, it is preferable according to the present invention for the degree of similarity between the polyol components used and the degree of similarity between the isocyanate components used to be essentially the same, i.e., for, for example, not less than 60 wt % of the polyol component used for constructing polyurethane (A) and polyurethane (B) to be identical and not less than 60 wt % of the at least one polyisocyanate component used for constructing polyurethane (A) and polyurethane (B) to be identical.

In one preferred embodiment, not less than 70 wt % of the polyol component used for constructing polyurethane (A) and polyurethane (B) is identical and not less than 70 wt % of the at least one polyisocyanate component used for constructing polyurethane (A) and polyurethane (B) is identical. In a further preferred embodiment, not less than 85 wt % of the polyol component used for constructing polyurethane (A) and polyurethane (B) is identical and not less than 85 wt % of the at least one polyisocyanate component used for constructing polyurethane (A) and polyurethane (B) is identical.

Accordingly, the present invention in a further embodiment provides a shaped article as described above wherein not less than 85 wt % of the polyol component used for constructing polyurethane (A) and polyurethane (B) is identical and not less than 85 wt % of the at least one polyisocyanate component used for constructing polyurethane (A) and polyurethane (B) is identical.

According to the present invention, the polyurethanes used are preferably thermoplastic polyurethanes. Accordingly, in a further embodiment, the present invention provides a shaped article as described above wherein the at least one polyurethane (A) is a thermoplastic polyurethane.

Polyurethane (A) and polyurethane (B) as used in the present invention are sufficiently similar in the sense defined above. The preference in the context of the present invention is for a firm chemical bond to form between the bead foam and the coating. Preference is therefore given to the use of such polyurethanes as are sufficiently soluble in the production process and form firm bonds with each other after drying. The solubility of polyurethanes is influenced, for example, by the Shore hardness or the degree of crosslinking. It is accordingly preferable in the present invention to use polyurethanes having a Shore hardness or a degree of crosslinking that ensure sufficient solubility.

Polyurethane (B) as used according to the present invention is preferably a thermoplastic polyurethane, in particular a thermoplastic polyurethane having a Shore hardness of below 98A, as determined to German standard specification DIN 53505, more preferably having a Shore hardness of below 90A, yet more preferably having a Shore hardness of below 85A, each as determined to German standard specification DIN 53505.

Polyurethane (B) as used according to the present invention preferably has a Shore hardness of above 30A, as determined to German standard specification DIN 53505, more preferably a Shore hardness of above 40A and yet more preferably a Shore hardness of above 50A, each determined to German standard specification DIN 53505.

Polyurethane (B) as used according to the present invention preferably has a Shore hardness in the range from 30A to 98A, as determined to German standard specification DIN 53505, more preferably a Shore hardness in the range from 40A to 90A and yet more preferably a Shore hardness in the range from 50A to 85A, each determined to German standard specification DIN 53505.

Accordingly, in a further embodiment, the present invention provides a shaped article as described above wherein the at least one polyurethane (B) is a thermoplastic polyurethane having a Shore hardness A of below 98A, as determined to German standard specification DIN 53505.

Polyurethane (A) and polyurethane (B) are constructed from at least a polyol component and a polyisocyanate component. In addition to the polyol and the polyisocyanate, the polyurethanes used according to the present invention are obtainable, for example, by using still further components such as extenders, catalysts and/or customary auxiliary and/or added-substance materials.

Any suitable polyols known to a person skilled in the art can in principle be used in the context of the present invention. Polyols are known per se to a person skilled in the art and are described for example in "Kunststoffhandbuch, Band 7, Polyurethane", Carl Hanser Verlag, 3rd edition 1993, chapter 3.1.

The present invention may employ for example polyesterols, polyetherols and/or polycarbonate diols, which are typically also subsumed under the term "polyols", with number-average molecular weights of 500 to 8000, preferably 600 to 6000 and especially 800 to 4000 g/mol, and preferably an average functionality of 1.8 to 2.3, preferably 1.9 to 2.2, especially 2. Mixtures comprising two or more polyols can also be used in the present invention. The present invention may similarly utilize polymeric or low molecular weight diols. By way of polyol, the present invention preferably employs polymeric diols or dials.

Accordingly, in a further embodiment, the present invention provides a shaped article as described above wherein the at least one polyol is selected from the group consisting of polyether diols and polyester diols.

Examples of diols useful for the present invention are 1,4-butanediol and 1,2-ethanediol.

Polymeric diols useful for the present invention are preferably polyether or polyester diols. It is particularly preferable for polytetrahydrofuran to be used as polymeric diol in the present invention.

Polytetrahydrofuran is obtained by known methods, for example by anionic polymerization with alkali metal hydroxides or alkali metal alkoxides as catalysts in the presence of at least one starter molecule comprising 2 or 3 reactive hydrogen atoms in bonded form, or by cationic polymerization with Lewis acids, such as antimony pentachloride or boron fluoride etherate, from one or more alkylene oxides such as tetrahydrofuran. Useful catalysts further include multimetal cyanide compounds, so-called DMC catalysts. Useful starter molecules include water or 2- and 3-hydric alcohols, such as ethylene glycol, 1,2-propanediol, 1,3-propanediol, diethylene glycol, dipropylene glycol, 1,4-butanediol, glycerol or trimethylolpropane.

Polytetrahydrofurans preferably have a functionality of 2 to 3, preferably 2, and molecular weights of 250 to 8000, preferably of 500 to 4000 g/mol and, in the case of the thermoplastic polyurethane, of 600 to 2500 g/mol.

Polyester polyols are obtainable for example from organic dicarboxylic acids having 2 to 12 carbon atoms, preferably aliphatic dicarboxylic acids having 4 to 10 carbon atoms, polyhydric alcohols, preferably diols, having 2 to 12 carbon atoms, preferably 2 to 6 carbon atoms. Useful dicarboxylic acids include for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. Dicarboxylic acids can be used not only singly but also in admixture with one another. Instead of the free dicarboxylic acids it is also possible to use the corresponding dicarboxylic acid derivatives, for example dicarboxylic esters of alcohols having 1 to 4 carbon atoms or dicarboxylic anhydrides. Preference is given to using dicarboxylic acid mixtures of succinic, glutaric and adipic acids in quantitative ratios of for example from 20 to 35:35 to 50:20 to 32 parts by weight, and especially adipic acid. Examples of di- and polyhydric alcohols, especially diols, are: ethanediol, diethylene glycol, 1,2-propanediol, 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is further possible to use polyester polyols of lactones, for example ε-caprolactone or hydroxycarboxylic acids, for example ω-hydroxycaproic acid. Particular preference is given to polyesters based on adipic acid and 1,4-butanediol.

Suitable polyester polyols have for example a functionality of 2 to 3, preferably a functionality of 2.

Suitable polyester polyols further for example have a molecular weight of 480 to 3000, preferably 1000 to 3000 g/mol and in the case of thermoplastic polyurethane of 500 to 2500 g/mol.

The preference in the context of the present invention is further for polyester diols, preferably polyester diols based on adipic acid and 1,4-butanediol, having a number-average molecular weight between 500 and 2500 g/mol, more preferably between 600 g/mol and 2400 g/mol.

Any suitable polyisocyanates known to a person skilled in the art can be used in the context of the present invention.

Suitable polyisocyanates include the prior art aliphatic, cycloaliphatic and aromatic di- or polyfunctional isocyanates and also any desired mixtures thereof. Examples are 4,4'-diphenylmethane diisocyanate, 2,4'-diphenylmethane diisocyanate, the mixtures of monomeric diphenylmethane diisocyanates and higher-nuclear homologs of diphenylmethane diisocyanate (polymer MDI), tetramethylene diisocyanate, hexamethylene diisocyanate (HDI), isophorone diisocyanate (IPDI), 4,4'-, 4,2- or 2,2'-methylenedicyclohexyl diisocyanate (H12MDI), 2,4- or 2,6-tolylene diisocyanate (TDI) or mixtures thereof.

Preference is given to using 4,4'-MDI. The preferably used 4,4'-MDI may comprise from 0 to 20 wt % of 2,4'-MDI and small amounts, up to about 10 wt %, of allophanate- or uretoneimine-modified polyisocyanates. Small amounts of polyphenylene polymethylene polyisocyanate (polymer MDI) can also be used. The total amount of these high-functionality polyisocyanates should not exceed 5 wt % of the isocyanate used.

Accordingly, in a further embodiment, the present invention provides a shaped article as described above wherein the at least one polyisocyanate is selected from the group consisting of diphenylmethane diisocyanate, hexamethylene diisocyanate, 4,4'-methylenedicyclohexyl diisocyanate and 2,4- or 2,6-tolylene diisocyanate.

As noted, polyurethanes suitable for the purposes of the present invention may comprise further constitutive components.

Useful extenders include, for example, generally/commonly known aliphatic, araliphatic, aromatic and/or cycloaliphatic compounds having a molecular weight of 50 to 499, preferably 2-functional compounds, for example diamines and/or alkanediols having 2 to 10 carbon atoms in the alkylene moiety, in particular 1,4-butanediol, 1,6-hexanediol and/or di-, tri-, tetra-, penta-, hexa-, hepta-, octa-, nona- and/or decaalkylene glycols of 3 to 8 carbon atoms, preferably the corresponding oligo- and/or polypropylene glycols, while mixtures of extenders can also be used.

Useful catalysts, particularly to hasten the reaction between the isocyanate groups and the hydroxyl groups, include the tertiary amines customary and known in the prior art, for example triethylamine, dimethylcyclohexylamine, N-methylmorpholine, N,N'-dimethylpiperazine, 2-(dimethylaminoethoxy)ethanol, diazabicyclo(2,2,2)octane and the like, and also specifically organometallic compounds such as titanic esters, iron compounds such as, for example, iron(III) acetylacetonate, tin compounds, e.g., tin diacetate, tin dioctoate, tin dilaurate or the tin dialkyl salts of aliphatic carboxylic acids such as dibutyltin diacetate, dibutyltin dilaurate or the like. Catalysts are typically used in amounts of 0.0001 to 0.1 part by weight per 100 parts by weight of polyhydroxy compound.

Customary auxiliaries and/or added-substance materials may further also be added. Examples include blowing agents, propellants, surface-active substances, fillers, flame retardants, nucleators, oxidation stabilizers, gliding and demolding aids, dyes and pigments, optionally in addition to the stabilizer mixtures of the present invention further stabilizers, for example against hydrolysis, light, heat or discoloration, organic and/or inorganic fillers, reinforcing agents and plasticizers.

The coated shaped articles of the present invention comprise a coating as well as a shaped article comprising bead foam.

According to the present invention, the foamed beads of polyurethane are preferably at least partially, more preferably completely, closed-cell.

The beads of polyurethane, in particular of thermoplastic polyurethane, are obtained from expandable beads, expanded beads or in a continuous process on an extruder.

The foamed beads in question consist of a foamed polyurethane material.

These foamed beads herein preferably have a diameter of 0.1 mm to 10 cm, preferably of 0.5 mm to 5 cm and more preferably of 1 mm to 2 cm and are preferably spherical or ellipsoidal. Diameter in the case of nonspherical beads, for example ellipsoidal beads, refers to the longest axis. The density of the foamed beads is preferably in the range from 0.005 to 0.50 g/cm$^3$, more preferably in the range from 0.01 to 0.3 g/cm$^3$ and especially in the range from 0.02 to 0.2 g/cm$^3$. The foamed beads preferably have a compact outer skin. By compact skin is meant that the foam cells are smaller in the outer region of the foamed beads than in their interior. It is particularly preferable for the outer region of the foamed beads not to contain any pores, and the cells of the beads are closed cells.

The shaped article comprising bead foam is obtained by fusing or adhering the bead foam and may have any desired shape in the present invention.

The polyurethane (B) coating applied to the shaped article in the present invention may comprise further components, for example pigments or fillers, stabilizers, UV control agents, waxes or processing aids, to improve the constitution of the surface.

In a further aspect, the present invention also provides a process for producing at least one coated shaped article, which process comprises at least the steps of
 (i) providing foamed beads comprising at least one thermoplastic polyurethane (A),
 (ii) fusing or adhering the foamed beads in the desired shape to obtain a shaped article,
 (iii) applying a coating comprising at least one polyurethane (B) to the shaped article,
wherein polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical.

Step (i) of the process according to the present invention comprises providing foamed beads comprising at least one thermoplastic polyurethane (A).

The production of polyurethanes, or of foamed beads comprising thermoplastic polyurethanes, is per se known to a person skilled in the art. The beads of thermoplastic polyurethane are typically obtained from expandable beads, expanded beads or in a continuous process on an extruder. Suitable processes are described in WO 2007/082838 or EP 10723971.7 for example.

These foamed beads are then fused or adhered together in the process of the present invention, wherein the mold and hence the shape of the shaped article obtained can be varied within wide limits. Suitable conditions for fusing or adhering a bead foam together are known per se to a person skilled in the art.

Step (iii) of the process according to the present invention comprises applying a coating comprising at least one polyurethane (B) to the shaped article obtained as per step (ii).

First the polyurethane (B) is dissolved to obtain a coating solution which in addition to said polyurethane (B) and the solvent may comprise further components, for example pigments or fillers. In general, the solution is obtainable in any way known to a person skilled in the art. Dissolving on a rolling track or in a stirred tank is suitable for example. If necessary, heat can be supplied to produce the solution. For example, dissolving in a heated or boiling solvent is also possible. It is also possible according to the present invention that the solution is produced using more than one solvent, for example two solvents, which are added in succession.

When the coating solution has been admixed with pigments or liquid dye, a colored coating is obtained. Individual regions of the shaped article to be coated may be dyed in different colors. For example, color progressions are also possible, or the shade can become darker or more intensive through repeated application. According to the present invention, pure colorless, transparent layers can also be applied in order to increase the robustness, abrasion resistance of the molding and reduce the surface roughness and tendency to soil. Similarly, a combination of a colored layer or colored print and a subsequent transparent coating is possible.

According to the present invention, the coating solution is applied, for example by brushing, dipping or spraying, preferably by brushing or spraying, to the shaped article obtained as per step (ii).

In a further embodiment, the present invention further provides a process for producing a coated shaped article as described above wherein the coating of step (iii) is applied in the form of a solution comprising at least one polyurethane (B).

Accordingly, in a further embodiment, the present invention provides a process for producing a coated shaped article as described above wherein the applying of step (iii) is effected by brushing, dipping or spraying.

The solvent used is chosen in the context of the present invention such that polyurethane (B) is dissolved to a sufficient degree while, on the other hand, the solvent is sufficiently volatile to allow the coated shaped article to dry within a sensible period for industrial processes. At the same time, the solvent is preferably chosen such that the molecular weight of polyurethane (B), used for coating, is not broken down.

The solvents used according to the present invention should not have an oxidizing or reducing effect. Polar or highly polar solvents are preferably used. The boiling point of the solvent used is preferably less than 150° C., more preferably less than 100° C.

Accordingly, in a further embodiment, the present invention provides a process for producing a coated shaped article as described above wherein the solvent used for the at least one polyurethane (B) does not break down the molecular weight of the at least one polyurethane (B).

Preferably, the solvent is preferably chosen such that the surface of the shaped bead foam article is also dissolved, incipiently, and that the molecular weight of the polyurethane of the shaped bead foam article is not broken down.

According to the present invention, a volatile solvent is used for the coating solution, for example THF, ethyl acetate, methyl ethyl ketone or acetone, especially THF or ethyl acetate, or mixtures thereof. According to the present invention, it is also possible to use aqueous dilutions, in particular aqueous dilutions of the recited solvents.

Accordingly, in a further embodiment, the present invention provides a process for producing a coated shaped article as described above wherein the solvent is selected from the group consisting of tetrahydrofuran, ethyl acetate and methyl ethyl ketone.

The coating solution is applied in one or more steps to obtain a coating having the aforementioned thickness after drying. Processes for applying the coating are known in principle to a person skilled in the art. Solvents or solvent mixtures are selected therefor according to the present invention such that the polyurethane is readily soluble therein while, on the other hand, the solvent is readily removable again. Depending on the area to be coated and the layer thickness which is desired, the coating can also be applied in one or more steps.

The coated shaped articles of the present invention and/or the shaped articles obtained using a process of the present invention have smooth surfaces and are obtainable in any desired shape. The coated shaped articles, which may be colored opaquely, have good mechanical properties.

Coated shaped articles of this type are suitable for use in the footwear and sports industry, as soles, midsoles, visible parts on sports implements, mats, damping elements and running tracks. For example, coated shaped articles can be used as shoe sole, bicycle saddle, cushioning, mattresses, underlays, grips, protective foils, in structural components for the automotive interior and exterior, in balls and sports implements or as floorcovering, in particular for sports surfaces, athletic running tracks, sports tracks, playgrounds and footpaths.

Accordingly, the present invention provides the method of using a coated shaped article as described above or a coated shaped article obtainable or obtained by a process of the present invention as shoe sole, bicycle saddle, cushioning, mattresses, underlays, grips, protective foils, in structural components for the automotive interior and exterior, in balls and sports implements or as floorcovering, in particular for sports surfaces, athletic running tracks, sports halls, playgrounds and footpaths.

By virtue of their smooth surfaces, which are readily colorable, and their high mechanical strength, the coated shaped articles of the present invention are particularly useful as a visible structural component.

Further embodiments of the present invention are derivable from the claims and the examples. It will be understood that the aforementioned and hereinbelow elucidated features of the article/process/uses according to the present invention can be used not just in the particular recited combination, but also in other combinations, without leaving the realm of the invention. For instance, the combination of a preferred feature with a particularly preferred feature or of a feature which has not been further characterized with a particularly preferred feature, etc. is also implicitly comprehended even when this combination is not expressly mentioned.

Exemplary embodiments of the present invention, which do not restrict the present invention, are described hereinbelow. More particularly, the present invention also comprehends those embodiments which result from the hereinbelow recited dependency references and hence combinations.

1. A coated shaped article comprising (a) at least one shaped article comprising foamed beads comprising at least one polyurethane (A) and (b) at least one coating comprising at least one polyurethane (B), wherein polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical.

2. The shaped article according to embodiment 1 wherein not less than 85 wt % of the polyol component used for constructing polyurethane (A) and polyurethane (B) is identical and not less than 85 wt % of the at least one polyisocyanate component used for constructing polyurethane (A) and polyurethane (B) is identical.

3. The shaped article according to embodiment 1 or 2 wherein the at least one polyurethane (A) is a thermoplastic polyurethane.

4. The shaped article according to any of embodiments 1 to 3 wherein the at least one polyurethane (B) is a thermoplastic polyurethane having a Shore hardness A of below 98A, as determined to German standard specification DIN 53505.

5. The shaped article according to any of embodiments 1 to 4 wherein the at least one polyol is selected from the group consisting of polyether dials and polyester dials.

6. The shaped article according to any of embodiments 1 to 5 wherein the at least one polyisocyanate is selected from the group consisting of diphenylmethane diisocyanate, hexamethylene diisocyanate, 4,4'-methylenedicyclohexyl diisocyanate and 2,4- or 2,6-tolylene diisocyanate.

The shaped article according to any of embodiments 1 to 6 wherein the coating has a thickness in the range from 50 to 1000 μm.

A process for producing at least one coated shaped article, which process comprises at least the steps of
 (i) providing foamed beads comprising at least one thermoplastic polyurethane (A),
 (ii) fusing or adhering the foamed beads in the desired shape to obtain a shaped article,
 (iii) applying a coating comprising at least one polyurethane (B) to the shaped article,
wherein polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical.

9. The process according to embodiment 8 wherein the coating of step (iii) is applied in the form of a solution comprising at least one polyurethane (B).

10. The process according to embodiment 8 or 9 wherein the applying of step (iii) is effected by brushing, dipping or spraying.

The process according to embodiment 9 or 10 wherein the solvent used for the at least one polyurethane (B) does not break down the molecular weight of the at least one polyurethane (B).

12. The process according to any of embodiments 9 to 11 wherein the solvent is selected from the group consisting of tetrahydrofuran, ethyl acetate and methyl ethyl ketone.

13. The method of using a coated shaped article according to any of embodiments 1 to 7 or a coated shaped article obtainable by a process according to any of embodiments 8 to 12 as shoe sole, bicycle saddle, cushioning, mattresses, underlays, grips, protective foils, in structural components for the automotive interior and exterior, in balls and sports implements or as floorcovering, in particular for sports surfaces, athletic running tracks, sports halls, playgrounds and footpaths.

The examples which follow serve to illustrate the invention, but are not in any way limiting with regard to the subject-matter of the present invention.

EXAMPLES

1. Production of Samples

A thermoplastic polyurethane was dissolved in an organic solvent. Different color pigments may be added to this solution. This colored TPU solution is processed in the manner of a commercially available colored varnish by brushing it on. Owing to the high vapor pressure of the solvent, the thinly applied solution evaporates to leave behind a homogeneous resilient coating. This coating is notable for its good adherence to the coated material, grippiness and special visuals. The color of the coating is freely chooseable via the choice of color pigments used. A transparent coating is likewise possible.

The production and properties of TPU coatings are described in the examples which follow. The inventive solutions were produced in the lab on an electric rolling track.

1.1 Example 1 (Inventive) Transparent

A granular thermoplastic polyurethane material based on polytetrahydrofuran, butanediol and monomeric MDI and having a Shore hardness of 70A was weighed into a screw lid jar in a mass ratio of 20 parts together with 80 parts of tetrahydrofuran. For dissolution, the container was commixed on a rolling track at room temperature for not less than 12 h. After complete dissolution of the granular TPU, 100 parts of ethyl acetate were added followed by commixing to the point of homogenization. This solution was applied with a brush to fused ETPU panels. Test specimens were removed from these panels thus coated to perform mechanical and optical tests.

1.2 Example 2 (Inventive) Black

A granular thermoplastic polyurethane material based on polytetrahydrofuran, butanediol and monomeric MDI and having a Shore hardness of 70A was weighed into a screw lid jar in a mass ratio of 20 parts together with 80 parts of tetrahydrofuran. For dissolution, the container was commixed on a rolling track at room temperature for not less than 12 h. After complete dissolution of the granular TPU, 2.5 parts of black lsopur color paste and 100 parts of ethyl acetate were added followed by commixing to the point of homogenization. This solution was applied with a brush to fused ETPU panels. Test specimens were removed from these panels thus coated to perform mechanical and optical tests.

1.3 Example 3 (Inventive) Blue

A granular thermoplastic polyurethane material based on polytetrahydrofuran, butanediol and monomeric MDI and having a Shore hardness of 70A was weighed into a screw lid jar in a mass ratio of 20 parts together with 80 parts of tetrahydrofuran. For dissolution, the container was commixed on a rolling track at room temperature for not less than 12 h. After complete dissolution of the granular TPU, 2.5 parts of blue color pigment and 100 parts of ethyl acetate were added followed by commixing to the point of homogenization. This solution was applied with a brush to fused ETPU panels. Test specimens were removed from these panels thus coated to perform mechanical and optical tests.

2. Results

The test specimens obtained were tested. The results are summarized in table 1.

TABLE 1

| | Method* | Uncoated | Coated black | Coated blue | Transparent coating |
|---|---|---|---|---|---|
| Density | DIN EN ISO 1183-1, A | 0.409 | 0.422 | 0.415 | 0.426 |
| Tensile strength | DIN 53504 | 3 | 3 | 3 | 3 |
| Gloss measurement (60°) | DIN 67530 | 8 | 19.5 | 10.1 | 11.3 |
| Gloss measurement (85°) | DIN 67530 | 8.7 | 11.3 | 7.3 | 7.3 |
| Elongation at break (edge) | DIN 53504 | 240 | 260 | 290 | 310 |
| Abrasion | DIN ISO 4649 | 236 | 234 | 240 | 176 |
| Coefficient of friction | *Ares Rheometer | 0.302 | 0.291 | 0.289 | 0.272 |

The results show that the shaped articles coated according to the present invention exhibit an improvement in gloss, elongation at break and coefficient of friction. The thin coatings tested in the examples do not affect the tensile strength of the test specimens. An increase in gloss and elongation at break and a reduction in friction is considered to be more advantageous.

*Parameters of Ares Rheometer:

Principle: surface friction measurement

Rubbing on standard tile with sodium laurylsulfate solution

Contact pressure: 244 g on 110.7 mm$^2$

Sample preparation: cleaned with 50:50 H$_2$O:ethanol

We claim:

1. A coated shaped article comprising
   (a) at least one shaped article comprising foamed beads comprising at least one polyurethane (A) and
   (b) at least one coating comprising at least one polyurethane (B),
   wherein polyurethane (A) and polyurethane (B) are each constructed from at least one polyol and at least one polyisocyanate and wherein not less than 50 wt % of the polyol component used for constructing polyurethane (A) and polyurethane (B) is identical and not less than 50 wt % of the at least one polyisocyanate component used for constructing polyurethane (A) and polyurethane (B) is identical, and
   wherein the coated shaped article, is obtained by a process comprises
   (i) providing foamed beads comprising at least one thermoplastic polyurethane (A),
   (ii) fusing or adhering the foamed beads in the desired shape to obtain a shaped article,
   (iii) applying a coating comprising at least one polyurethane (B) to the shaped article,
   wherein at least 15 wt % of the polyol component used for constructing polyurethane (A) and polyurethane (B) is not identical and/or at least 15 wt % of the at least one polyisocyanate component used for constructing polyurethane (A) and polyurethane (B) is not identical.

2. The shaped article according to claim 1, wherein the at least one polyurethane (A) is a thermoplastic polyurethane.

3. The shaped article according to claim 1, wherein the at least one polyurethane (B) is a thermoplastic polyurethane having a Shore hardness A of below 98A, as determined to German standard specification DIN 53505.

4. The shaped article according to claim 1, wherein the at least one polyol is selected from the group consisting of polyether diols and polyester diols.

5. The shaped article according to claim 1, wherein the at least one polyisocyanate is selected from the group consisting of diphenylmethane diisocyanate, hexamethylene diisocyanate, 4,4'-methylenedicyclohexyl diisocyanate and 2,4- or 2,6-tolylene diisocyanate.

6. The shaped article according to claim 1, wherein the coating has a thickness in the range from 50 to 1000 .mu.m.

7. An article, comprising the coated shaped article according to claim 1, wherein the article is selected from the group consisting of a shoe sole, a bicycle saddle, a cushion, a mattress, an underlay, a grip, a protective foil, a structural component for an automotive interior, a structural component for an automotive exterior, a ball, a sports implement, and a floorcovering.

* * * * *